(12) United States Patent
Hoffmann et al.

(10) Patent No.: US 9,618,054 B2
(45) Date of Patent: Apr. 11, 2017

(54) TORSIONAL VIBRATION DAMPER

(71) Applicant: Schaeffler Technologies GmbH & Co. KG, Herzogenaurach (DE)

(72) Inventors: Jan Hoffmann, Rastatt (DE); Christian Dinger, Lauf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/399,089

(22) PCT Filed: Jun. 19, 2013

(86) PCT No.: PCT/EP2013/062797
§ 371 (c)(1),
(2) Date: Jan. 23, 2015

(87) PCT Pub. No.: WO2014/009124
PCT Pub. Date: Jan. 16, 2014

(65) Prior Publication Data
US 2015/0126290 A1  May 7, 2015

(30) Foreign Application Priority Data

Jul. 10, 2012 (DE) .......... 10 2012 211 993

(51) Int. Cl.
*F16F 15/123* (2006.01)
*F16F 15/134* (2006.01)
(Continued)

(52) U.S. Cl.
CPC .......... *F16D 3/12* (2013.01); *F16F 15/13484* (2013.01); *F16D 2300/22* (2013.01);
(Continued)

(58) Field of Classification Search
CPC ..... F16D 3/12; F16D 3/14; F16D 7/02; F16D 7/025; F16D 2300/22; F16F 15/123;
(Continued)

(56) References Cited

U.S. PATENT DOCUMENTS 6,280,333 B1 * 8/2001 Thevenon ............... F16H 45/02
464/68.1
6,293,380 B1 * 9/2001 Arhab ..................... F16H 45/02
192/212
(Continued)

FOREIGN PATENT DOCUMENTS

CN   101210589   7/2008
CN   101305218   11/2008
(Continued)

*Primary Examiner* — Josh Skroupa
(74) *Attorney, Agent, or Firm* — Simpson & Simpson, PLLC

(57) ABSTRACT

A torsional vibration damper comprises an input side and an output side which are arranged rotatably around an axis of rotation, an intermediate plate, and two elastic elements which are arranged on different circumferences around the axis of rotation, where the first elastic element is set up to transmit a power from the input side to the intermediate plate and the second elastic element is set up to transmit a power from the intermediate plate to the output side. Furthermore, the torsional vibration damper includes a single-piece retainer to support the first elastic element on a radially outer surface, while the retainer includes a contact element for engaging with one end of the first elastic element.

14 Claims, 3 Drawing Sheets

(51) Int. Cl.
*F16D 3/12* (2006.01)
*F16H 45/02* (2006.01)
*F16F 15/131* (2006.01)
*F16F 15/14* (2006.01)

(52) U.S. Cl.
CPC ....... *F16F 15/13164* (2013.01); *F16F 15/145* (2013.01); *F16H 2045/0221* (2013.01)

(58) Field of Classification Search
CPC ............. F16F 15/1232; F16F 15/12323; F16F 15/1234; F16F 15/12353; F16F 15/13121; F16F 15/13164; F16F 15/134; F16F 15/1343; F16F 15/13469; F16F 15/13484; F16F 15/137; F16F 15/1421; F16F 15/1428; F16F 15/145; F16F 15/1457; F16F 15/12313; F16H 45/02; F16H 2045/0221; F16H 2045/0226; F16H 2045/0231
USPC .... 464/45, 46, 68.1, 68.4, 68.41, 68.7, 68.8, 464/68.9, 68.92
See application file for complete search history.

(56) References Cited

U.S. PATENT DOCUMENTS

| | | | | |
|---|---|---|---|---|
| 6,332,516 B1 * | 12/2001 | Arhab | ................... | F16H 41/24 192/3.29 |
| 7,658,679 B2 * | 2/2010 | Avins | ..................... | F16H 45/02 464/68.1 |
| 7,743,900 B2 * | 6/2010 | Breier | ..................... | F16H 45/02 464/68.1 |
| 8,382,598 B2 * | 2/2013 | Soto | ....................... | F16F 15/121 464/68.1 |
| 8,771,088 B2 * | 7/2014 | Takikawa | ................ | F16H 45/02 464/68.8 |
| 8,960,396 B2 * | 2/2015 | Feldhaus | ............. | F16F 15/1207 464/68.1 |
| 2010/0089046 A1 * | 4/2010 | Tomiyama | .............. | F16H 45/02 60/364 |
| 2011/0287844 A1 * | 11/2011 | Steinberger | ....... | F16F 15/13492 464/68.8 |
| 2012/0111683 A1 * | 5/2012 | Ito | ......................... | F16F 15/145 192/3.28 |
| 2014/0041479 A1 * | 2/2014 | Dinger | ............. | F16F 15/12353 74/574.4 |
| 2014/0216879 A1 * | 8/2014 | Gerdeman | ............. | F16H 45/02 192/3.28 |

FOREIGN PATENT DOCUMENTS

| | | |
|---|---|---|
| DE | 19709341 | 12/1998 |
| EP | 0648957 | 4/1995 |
| JP | 2001082577 | 3/2001 |
| JP | 2002089658 | 3/2002 |
| WO | 2012063586 | 5/2012 |

* cited by examiner

TORSIONAL VIBRATION DAMPER

CROSS-REFERENCE TO RELATED APPLICATIONS

The present application is the U.S. national stage application pursuant to 35 U.S.C.§371 of International Application No. PCT/EP2013/062797, filed on Jun. 19, 2013, which application claims priority from German Patent Application No. DE 10 2012 211 993.0, filed on Jul. 10, 2012, which applications are incorporated herein by reference in their entireties.

TECHNICAL FIELD

The invention relates generally to a torsional vibration damper, and, more specifically, to a torsional vibration damper having two elastic elements arranged concentrically to each other to transmit torque between an input side and an output side.

BACKGROUND

A torsional vibration damper may be used to transmit torque in a drivetrain, for example of a motor vehicle. A typical torsional vibration damper couples an output shaft of a drive motor with a drive shaft of a transmission. Typical torsional vibration dampers also dampen or cancel out torsional vibrations. To that end, a typical torsional vibration damper comprises one or more elastic elements which behave as short-term energy storage devices in the event of fluctuation in the torque that is to be transmitted.

SUMMARY

According to aspects illustrated herein, there is provided a torsional vibration damper having an axis of rotation, an input flange arranged to receive torque, an output flange having a first outer circumferential surface, an intermediate plate configured to transmit torque between the input flange and the output flange, a first elastic element having a first end circumferentially displaced from a second end, and a second outer circumferential surface, the first elastic element operatively arranged to transmit torque from the input flange to the intermediate plate, a second elastic element displaced radially inward from the first elastic element and operatively arranged to transmit torque from the intermediate plate to the output flange, and, a retainer to brace the first elastic element at the second outer circumferential surface, the retainer having a contact element to engage the first end of the first elastic element, the retainer centered on the axis of rotation and supported by the first outer circumferential surface, wherein the retainer is rotatable with respect to the output flange.

According to aspects illustrated herein, there is provided a torsional vibration damper having an axis of rotation, an input flange arranged to receive torque, an output flange having a first outer circumferential surface, an intermediate plate configured to transmit torque between the input flange and the output flange, a first elastic element having a first end circumferentially displaced from a second end, and a second outer circumferential surface, the first elastic element operatively arranged to transmit torque from the input flange to the intermediate plate, a second elastic element displaced radially inward from the first elastic element and operatively arranged to transmit torque from the intermediate plate to the output flange, and, a retainer to brace the first elastic element at the second outer circumferential surface, the retainer having a contact element to engage the first end of the first elastic element, the retainer centered on the axis of rotation and supported by the first outer circumferential surface, wherein the retainer is rotatable with respect to the output flange and is an integral piece of material In an example embodiment, one of the elastic elements is formed by a bow spring. The bow spring lies on a circumference around an axis of rotation of the torsional vibration damper, and is held in a radially outer direction by a holding element (retainer). When the vibration damper rotates, the bow spring is pressed radially outward against the retainer due to its inertia opposing the centripetal acceleration. The retainer withstands the load due to the bow spring and at the same time exerts a frictional damping on individual coils of the bow spring. If the two elastic elements are arranged concentrically on different radii around the axis of rotation, then the retainer of the outer elastic element may be constructed out of a plurality of parts which are joined together axially, so that it can fulfill tasks of a radial holding function, of transmitting torque from an input side of the torsional vibration damper to one end of the first elastic element, and if necessary also of bracing the first elastic element in one or two axial directions. The plurality of parts of the retainer must be joined together in a separate operation during the fabrication of the torsional vibration damper, which incurs costs. Furthermore, such a torsional vibration damper cannot be optimized in terms of the construction space used, in particular in the radial direction.

The single-piece design of the retainer makes it possible to reduce a complexity in the manufacture and assembly of the torsional vibration damper, which can result in cost benefits. In addition, a construction space, which would be necessary in a multiple-piece design for a connecting element such as a rivet, can be omitted, so that the torsional vibration damper being formed can provide greater constructional freedoms with regard to its configuration, size, and the design of neighboring elements.

In an example embodiment, the retainer is mounted rotatably and centered relative to the axis of rotation on a radially outer surface of the output side. The output side thus serves to center and support the retainer, but not to introduce or extract torque. This improves the fixing of the second elastic element, without the need for a dedicated support element to be provided for the retainer.

The retainer can include, on a radially outer surface of the first elastic element, a meshing element to transmit torque from the input side. Through the introduction of the torque on a relatively large radius, the transmission of torque from the input side into the retainer can be improved. Torque-transmitting elements on a radially inner side of the first elastic element can be eliminated. This makes it possible for an enlarged construction space to be provided, in particular in an area in which a large number of components are situated and which are movable relative to each other.

In an example embodiment, the meshing element includes axially directed toothing. The toothing can be produced at a reasonable cost, and can enable simple mounting of the retainer from the axial direction. In an example embodiment, the retainer can be included in a separate sub-assembly where the mounting of the torsional vibration damper can proceed more quickly and cost-effectively.

A clutch can be situated between the input side and the retainer, the clutch element being axially movable and non-rotatably connected with the retainer. The clutch may comprise a single-disk or multiple-disk friction clutch. When the toothing described above is used, the frictional partner of the clutch can be moved axially to engage with the toothing of the meshing element, so that a controllable transmission of force between the input side and the retainer can be provided in a simple manner.

In an example embodiment, the intermediate plate comprises two plate elements offset axially from each other, which are non-rotatably connected to each other, while the retainer is fixed axially between the plate elements. The two plate elements may be necessary to guarantee the torsional vibration damping function of the second elastic element, so that elements that are already present can be used for the additional function of the axial fixing of the retainer. Through this designed multiple use of existing elements, a complexity of the torsional vibration damper can be reduced, which can result in cost benefits.

In an example embodiment, the retainer is set up to also brace the first spring element in the axial direction. In this way, the first spring element can be fixed adequately both radially and axially, so that additional guiding or holding devices are not necessary.

In an example embodiment, the torsional vibration damper includes a turbine to couple the input side with the intermediate plate. This makes it possible to provide a compact and efficient arrangement for torsional vibration damping.

In an example embodiment, a pendulum mass is movably situated in a plane of rotation at the intermediate plate. Through use of the pendulum mass, additional torsional vibrations between the input side and the output side can be canceled. In combination with the turbine named above, a turbine damper can be provided which is known for its positive properties of decoupling or canceling torsional vibrations.

An object of the present invention is to specify a simplified and construction-space-optimized torsional vibration damper.

These and other objects, advantages and features of the present invention will be better appreciated by those having ordinary skill in the art in view of the following detailed description of the invention in view of the drawings.

BRIEF DESCRIPTION OF THE DRAWINGS

The invention will now be described in greater detail by reference to the accompanying figures, in which the figures represent the following.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

By "non-rotatably connected" first and second components we mean that the first component is connected to the second component so that any time the first component rotates, the second component rotates with the first component, and any time the second component rotates, the first component rotates with the second component. Axial displacement between the first and second components is possible.

The present invention is at least partially described within the context of a cylindrical coordinate system. As used herein, "axial" means parallel to axis 130 in FIG. 2 (or, in other words, for example, parallel to the length of a cylinder). As used herein, "radial" means orthogonal to axis 130 (an example of a radial line is the radius of a circular end face of a cylinder). As used herein, "circumferential" is defined by an endpoint of a radius—i.e., orthogonal to axis 130—rotated about axis 130.

To clarify the spatial terminology, an axial surface is formed by a plane co-planar with axis 130. A radial surface is formed by a plane orthogonal to axis 130 and co-planar with a radius.

Figure 1:
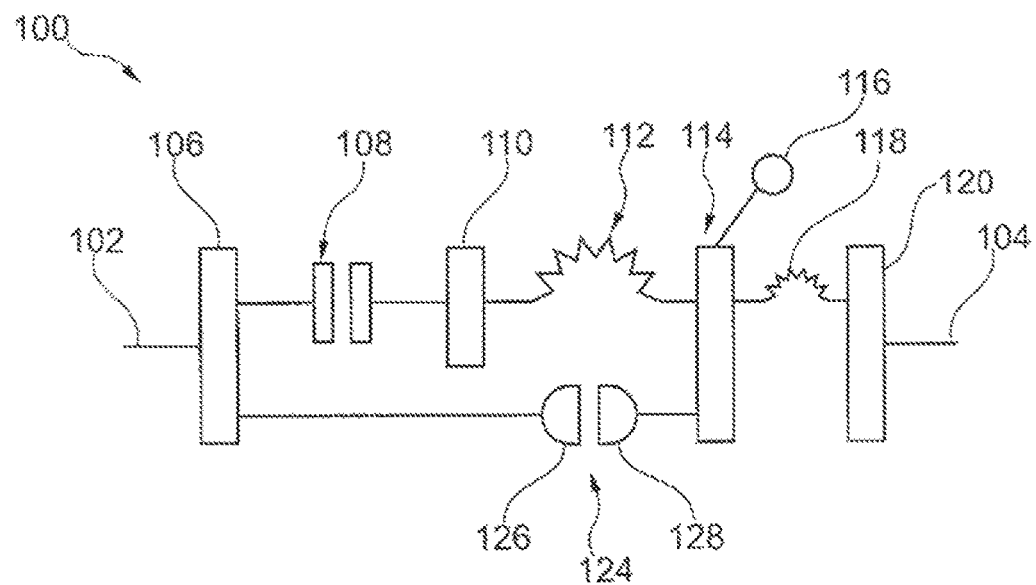
FIG. 1 is a schematic depiction of a torsional vibration damper, according to an example embodiment.

FIG. 1 shows a sectional schematic of an exemplary embodiment of torsional vibration damper 100. In FIG. 1, all components of torsional vibration damper 100 are depicted as elements of a circuit diagram.

Torsional vibration damper 100 comprises input side 102, output side 104, input flange 106, friction clutch 108, retainer 110, first elastic element 112, intermediate plate 114, pendulum mass 116, second elastic element 118, output flange 120, and turbine 124. Turbine 124 has impeller 126 and turbine wheel 128. In an example embodiment, only input side 102, output side 104, elastic elements 112 and 118, and intermediate plate 114 are present. The remaining elements (e.g., input flange 106, friction clutch 108, retainer 110, pendulum mass 116, etc.) may be present or may be omitted in any combination in various embodiments.

Input side 102 is set up to introduce a torque, e.g., from an output shaft of a drive motor. The drive motor can be an internal combustion engine in a drivetrain of a motor vehicle. Output side 104 may be set up for delivering torque to a transmission. As will be shown later in greater detail, input side 102 and output side 104 are rotatable around a common axis of rotation in an example embodiment. Further, the remaining rotatable elements of the torsional vibration damper are movable in relation to the same axis of rotation. At the same time, input flange 106 can represent a housing of torsional vibration damper 100. As a result, the utilized elements of torsional vibration damper 100 can advantageously run in a liquid bath, in particular in an oil bath. This example embodiment may be of benefit in particular in combination with hydrostatic turbine 124.

Friction clutch 108 can be, but is not limited to, an axially operable single-disk or multiple-disk friction clutch. As a function of an axially operating force, a frictional engagement may be established or severed between the ends of friction clutch 108. Retainer 110 transmits torque between friction clutch 108 and first elastic element 112, and braces first elastic element 112 on the radial outer surface of clutch 108.

Elastic elements 112 and 118 may each include a bow spring, whereas second elastic element 118 may also be designed as a compression spring. Elastic elements 112 and 118 may also each include a plurality of axially or coaxially arranged individual spring elements. Positioned in the path of torque transmission between elastic elements 112 and 118 is intermediate plate 114. In an example embodiment, intermediate plate 114 comprises two plate elements which are offset axially relative to each other in an order similar to retainer 110 relative to first elastic element 112. This configuration fixes second elastic element 118 in the radial direction and enables torque to be transmitted to or from second elastic element 118. In an example embodiment, output flange 120 may be designed as a hub flange.

Torque is transmitted between input flange 106 and intermediate plate 114 via turbine 124 when the two elements are rotating at different speeds, which may make it easier to drive a motor vehicle. As the difference in speed of rotation decreases (i.e., as the speed ratio decreases), the torque transmitted between them by means of turbine 124 also decreases. In order to reduce transmission losses in turbine 124 when the motor vehicle is moving, torque may be transmitted between input side 102 and output side 104 by engaging friction clutch 108.

Figure 2:
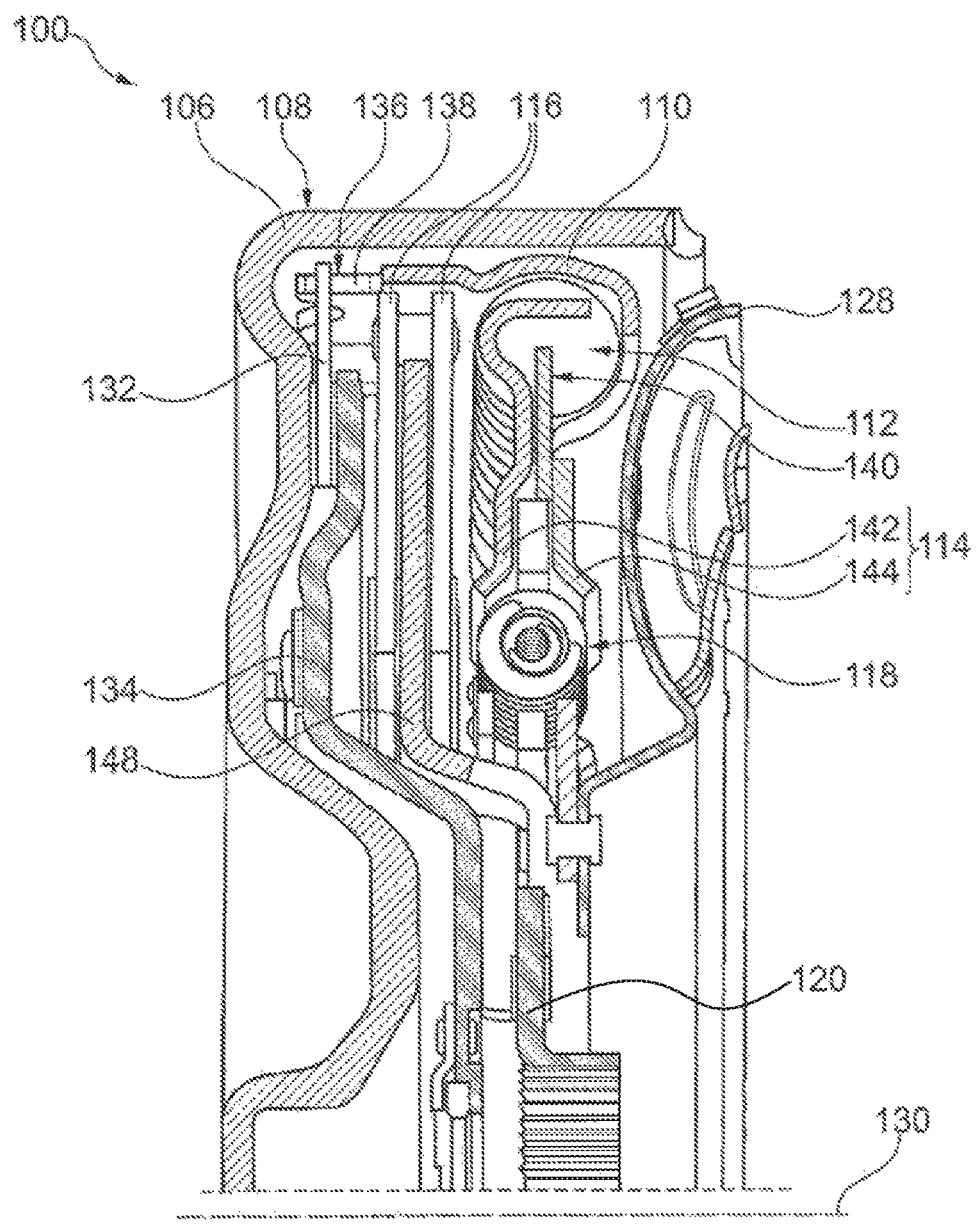
FIG. 2 is a cross-sectional view of a torsional vibration damper according to an example embodiment; and, FIG. 3 is a cross-sectional fragmentary view of the torsional vibration damper from FIG. 2 in a different rotational position.

FIG. 2 is a cross-sectional view of torsional vibration damper 100 corresponding to the depiction in FIG. 1. What is shown is a portion of torsional vibration damper 100 located above axis of rotation 130.

Input flange 106 is designed as a housing of torsional vibration damper 100. Located on the inner surface of input flange 106, and in a radially outer region, is friction disk 132 of friction clutch 108. Friction disk 132 may become frictionally engaged with input flange 106 by means of a spring-loaded piston that presses disk 132 axially against input flange 106.

On its radial outer surface, friction disk 132 has toothing 136, which is meshed with corresponding toothing 138 of retainer 110 so that friction disk 132 is axially movable. First elastic element 112 rests against a radially inner surface of retainer 110. In the example embodiment shown in FIG. 2, retainer 110 is shaped so that it supports first elastic element 112 in both axial directions. Retainer 110 at least partially encompasses first elastic element 112 axially on an axial side of first elastic element 112 opposite input flange 106, and then continues to extend radially inward.

Retainer 110 has a radially inner surface in contact with output flange 120, so that output flange 120 supports retainer 110 in the radial direction and centers it with respect to axis of rotation 130. However, the interface between the radially inner surface of retainer 110 and the output flange 120 does not result in a non-rotatable connection between the two components.

Retainer 110 also includes contact element 140 in order to engage with or contact an end of first elastic element 112. A section of first disk element 142 contacts first elastic element 112 at an end opposite contact element 140. Contact element 140 is disposed axially between first disk element 142 and second disk element 144. Disk elements 142 and 144 are non-rotatably connected with each other, for example by means of a riveted connection. Together, disk elements 142 and 144 form intermediate plate 114. A section of at least one of disk elements 142 and 144 is in contact with an end of second elastic element 118. In the example embodiment shown in FIG. 2, second elastic element 118 is located radially inward to first elastic element 112. An opposite end of second elastic element 118 is in contact with a section of output flange 120. Disk elements 142 and 144 are shaped so that they support second elastic element 118 at least radially on the outside. In an example embodiment, disk elements 142 and 144 also support second elastic element 118 in one or both axial directions.

Second disk element 144 is connected to pendulum flange 148, which extends radially outward and supports pendulum mass 116. Pendulum mass 116 is moveable in a plane of rotation around axis of rotation 130. Furthermore, turbine wheel 128 of turbine 124 is connected to second disk element 144.

Figure 3:
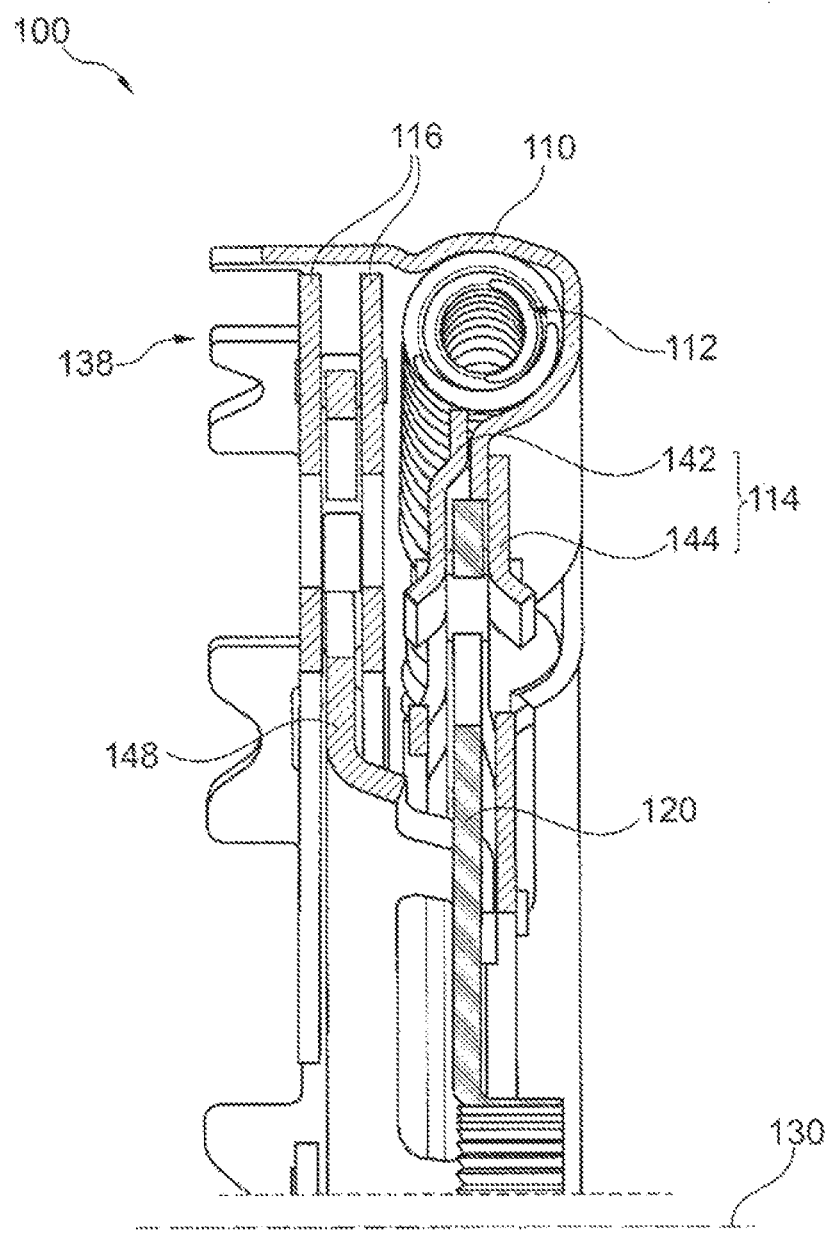

FIG. 3 shows a longitudinal section through a part of torsional vibration damper 100 from FIG. 2 in a different rotational position around axis of rotation 130. In FIG. 3, input flange 106, friction disk 136, piston 134, second elastic element 118 and turbine wheel 128 are omitted.

Toothing 138 of retainer 110 is best seen in FIG. 3. FIG. 3 also clearly shows how sections of disk elements 142 and 144 of intermediate plate 114 are set up to rest against an end of second elastic element 118.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMBERS

100 Torsional vibration damper
102 Input side
104 Output side
106 Input flange
108 Friction clutch
110 Retainer
112 First elastic element
114 Intermediate plate
116 Pendulum mass
118 Second elastic element
120 Output flange
124 Turbine
126 Impeller
128 Turbine wheel
130 Axis of rotation
132 Friction disk
134 Piston
136 Toothing
138 Toothing
140 Contact element
142 First disk element
144 Second disk element
148 Pendulum flange

What is claimed is:
1. A torsional vibration damper, comprising:
an axis of rotation;
an input flange arranged to receive torque;
an output flange having a first outer circumferential surface;
an intermediate plate configured to transmit torque between the input flange and the output flange;
a first elastic element having a first end circumferentially displaced from a second end, and a second outer circumferential surface, the first elastic element operatively arranged to transmit torque from the input flange to the intermediate plate;

a second elastic element displaced radially inward from the first elastic element and operatively arranged to transmit torque from the intermediate plate to the output flange;

a retainer to brace the first elastic element at the second outer circumferential surface, the retainer having a contact element to engage the first end of the first elastic element, the retainer centered on the axis of rotation and supported by the first outer circumferential surface, wherein the retainer is rotatable with respect to the output flange; and, a clutch axially arranged between the input flange and the retainer, the clutch having a friction disk non-rotatably connected to the retainer and operatively arranged to frictionally engage with the input flange by means of a piston that presses the friction disk axially against the input flange.

2. The torsional vibration damper of claim 1, wherein the retainer has a meshing element on an outer radial surface of the first elastic element to transmit torque from the input flange to the retainer.

3. The torsional vibration damper of claim 2, wherein the meshing element is axially directed toothing.

4. The torsional vibration damper of claim 1, wherein the intermediate plate comprises two axially disposed disk elements non-rotatably connected to each other, and between which the retainer is axially fixed.

5. The torsional vibration damper of claim 1, wherein the retainer is also operatively arranged to brace the first elastic element in an axial direction.

6. The torsional vibration damper of claim 1, further comprising a turbine to couple the input flange with the intermediate plate.

7. The torsional vibration damper of claim 1, further comprising a pendulum flange non-rotatably connected to the intermediate plate, and a pendulum mass rotatably supported by the pendulum flange.

8. A torsional vibration damper, comprising:

an axis of rotation;

an input flange arranged to receive torque;

an output flange having a first outer circumferential surface;

an intermediate plate configured to transmit torque between the input flange and the output flange;

a first elastic element having a first end circumferentially displaced from a second end, and a second outer circumferential surface, the first elastic element operatively arranged to transmit torque from the input flange to the intermediate plate;

a second elastic element displaced radially inward from the first elastic element and operatively arranged to transmit torque from the intermediate plate to the output flange;

a retainer to brace the first elastic element at the second outer circumferential surface, the retainer having a contact element to engage the first end of the first elastic element, the retainer centered on the axis of rotation and supported by the first outer circumferential surface, wherein the retainer is rotatable with respect to the output flange and is an integral piece of material; and, a clutch axially arranged between the input flange and the retainer, the clutch having a friction disk non-rotatably connected to the retainer and operatively arranged to frictionally engage with the input flange by means of a piston that presses the friction disk axially against the input flange.

9. The torsional vibration damper of claim 8, wherein the retainer has a meshing element on an outer radial surface of the first elastic element to transmit torque from the input flange to the retainer.

10. The torsional vibration damper of claim 9, wherein the meshing element is axially directed toothing.

11. The torsional vibration damper of claim 8, wherein the intermediate plate comprises two axially disposed disk elements non-rotatably connected to each other, and between which the retainer is axially fixed.

12. The torsional vibration damper of claim 8, wherein the retainer is also operatively arranged to brace the first elastic element in an axial direction.

13. The torsional vibration damper of claim 8, further comprising a turbine to couple the input flange with the intermediate plate.

14. The torsional vibration damper of claim 8, further comprising a pendulum flange non-rotatably connected to the intermediate plate, and a pendulum mass rotatably supported by the pendulum flange.

* * * * *